Patented Feb. 17, 1953

2,628,917

UNITED STATES PATENT OFFICE 2,628,917

THERMOPLASTIC RESINS FORMED FROM PINEWOOD PITCH

Thomas R. McElhinney and Thomas D. Woodruff, Lockport, La., assignors to Valite Corporation, New Orleans, La., a corporation of Louisiana No Drawing. Application October 11, 1949, Serial No. 120,815

24 Claims. (Cl. 106—222)

The present invention relates to improvements in thermoplastic resins and is a continuation-in-part of our similarly entitled applications, Serial No. 497,070, filed August 2, 1943, and Serial No. 756,104, filed June 20, 1947, and now abandoned.

This invention relates broadly to thermoplastic resins and more particularly, to the improvement of certain natural resins and to methods of producing the improved products, and, more specifically, it relates to the modification of extracted pinewood pitches to make them suitable for use in the manufacture of phonograph records.

The further object of the invention is to produce a modified product of pinewood pitch which is compatible in all proportions with shellac, copal, and other natural and synthetic resins presently used in the manufacture of phonograph record compositions.

As is well known, rosin is extracted from pinewood by the use of a suitable solvent such as gasoline, benzol, etc., after removing the volatile oils such as turpentine and pine oil, by means of steam distillation. By another method, the volatile oils, such as turpentine or pine oil may be extracted along with the rosin without first steaming for their removal.

Following extraction the extract is distilled for the removal of this solvent or for the removal of solvent and volatile oils if the wood was not steamed before extraction. As a result of the distillation, resinous material containing abietic acid and admixed impurities comprising oxidized resin acids, oxidized abietic acid, oxidized terpenes, polyphenols, polymerized terpenes, and usually more or less ligneous matter is obtained. This resinous material may be treated in any one of a number of ways, all known to the art, for the removal of refined rosin and including oxidized abietic acid, oxidized terpenes, polyphenols, polymerized terpenes, and ligneous matter originally present in the extract and comprising a dark-colored, hard, resinous mass constituting the pinewood pitch, a natural resin, the improvement of which is the object of this invention.

It is well known that pinewood pitch of this type has been found suitable for replacing a small amount of the shellac and other resins ordinarily used in making phonograph records, and it is also well known that it cannot be entirely or even mostly substituted for the shellac. If used to replace more than 40% of the shellac in the usual formulate, records made from such compositions are weak and, more undesirable, are only suitable for playing a limited number of times, after which the resin surface of the record breaks down and loses its binding quality, resulting in an excessive amount of surface noise and a serious impairment of the quality of reproduction. It is an object of this invention to improve this wood pitch so that it can be substituted for all of the shellac normally used in phonograph record molding compositions.

It is known (United States Patent No. 2,115,496) that this wood pitch will combine with an aldehyde to form a thermo-reactive resin. However, we have found that the wood pitch will combine with a specified aldehyde, namely furfural, and drying oils, such as linseed oil, tall oil, etc., at elevated temperatures to form a permanently thermoplastic resin suitable for entirely replacing shellac in phonograph record molding compositions. The exact mechanics of the reaction or reactions are not known. Since it is known that the general class of aldehydes react with the wood pitch to form thermo-reactive resins, it is assumed that in the specific case of furfural the principal reaction is not with the aldehydic group of the furfural, but with some member of the ring nucleus of furfural, or that the reaction does not proceed to form the large and heterogeneous molecules formed during the well-known resinifying action between phenol and aldehydes. The drying oil presumably reacts in some manner to absorb oxygen from some of the oxidized components of the wood pitch. During the course of the reaction a small amount of non-condensable gas and a high boiling oily material with a sharp, penetrating odor are distilled off. The maximum limits of the furfural and linseed oil taking place in the reaction are clearly defined. Any excess of furfural above about 10% distills off during the reaction and above about 15% is generally uneconomic, but excess furfural does not injure the product. Any excess of drying oil, e. g., linseed oil above about 6%, remains in the finished product unreacted and is usually not desirable because it causes stickiness and, for most purposes, too low a softening point in the finished resin. The minimum limits for these reagents are not so clearly defined, since even about 2% or 3% of furfural and even about one-half of 1% of drying oil will cause a marked improvement in the original wood pitch. All percentages given above are based on the original weight of hardwood pitch.

In order that a resin be suitable for use in making phonograph records, it is essential that it possess certain properties similar to those which have made shellac the predominant resin in this field. Chief among these properties are a softening point low enough to permit the resin to flux properly during compounding of the record composition and during molding of the record and high enough to remain hard at temperatures normally encountered by phonograph records during storage and use; the ability to flow and cover the fillers used to cheapen and strengthen phonograph record compositions, a property indicated by ability to produce a long thread when heated and stretched; hardness without brittleness; the property of being permanently thermoplastic; and compatibility with other resins and lubricants commonly used in phonograph record compositions.

The products of our invention possess all these properties to a marked degree, and, although somewhat more brittle than shellac, still give products with strength comparable with records made from shellac compositions and somewhat better in tonal quality and fidelity of reproduction.

It is well known to those skilled in the art that the chemical and physical properties of the pinewood pitch remaining as a residue after the extraction of rosin will vary according to the method used for extracting the rosin. Any treatment given to this pitch to improve its properties will, therefore, necessarily be varied in accordance with the nature of the specific pitch used. The examples of treatment given below are for the purpose of illustration and are not to be construed as limiting the proportions to the specified quantities. A pitch obtained by a given method is used in the example given below. A pitch obtained by a different method, while essentially the same in composition, might require a slight variation in treatment.

*Example 1*

In this example the pinewood pitch used is obtained by the following method:

Pinewood stumps are steamed to remove the volatile oils, such as turpentine and pine oil, and then extracted with hot solvent naphtha, the solution of which is allowed to cool and settle until the more highly oxidized abietic acid and terpenes are settled out together with some polyphenols and polymerized terpenes. The solvent naphtha is removed from the precipitate by filtration and evaporated, leaving a residue containing rosin and admixed impurities consisting of polyphenols, and oxidized abietic acid and terpenes less highly oxidized than those precipitated by the first settling. This residue is re-dissolved in fresh naphtha and allowed to settle again to obtain a highly refined rosin in solution and a residue consisting of polyphenols and terpenes and slightly oxidized abietic acid and terpenes. This residue constitutes the pitch used in this example.

The pitch described above, about 1000 lbs.; furfural, about 100 lbs.; drying oil, e. g., raw linseed oil, about 60 lbs.; and softening agent, e. g., beeswax, about 15 lbs., at about room temperature (70° F.) are heated together in an open kettle until fluid, at about 100° C. Agitation is started and heating continued as rapidly as possible until the temperature of the mass reaches about 232° C. The product is then poured into shallow containers for cooling. The cooled product is a hard, brownish-black, permanently thermoplastic, tough resin, suitable for use in place of shellac in phonograph record compositions.

The temperature cited in the above example is for the purpose of illustration only and can be varied widely between approximately 210° C. and 250° C. The particular temperature cited, 232° C., is considered the optimum, however, as lower final temperatures lower the softening point of the finished resin and higher temperatures raise the softening point. Lowering of the softening point gives the finished records a tendency to warp. Raising of the softening point makes it more difficult to secure complete coverage of filler materials used in the compound.

The beeswax used in the above example is for the purpose of plasticizing the finished resin, and it will be apparent that the percentage used may vary widely according to the degree of plasticity desired. It will also be apparent that any other compatible softening agent may be used in place of beeswax, including wood rosin, creosote oil, chlorinated naphthalenes, micro-crystalline petroleum waxes, and others too numerous to mention. In some cases, the softening agent will not be required and will then be omitted from the above example, the procedure being otherwise as recited.

For the purpose of illustrating how this resin may be used in making phonograph record molding compositions, the following typical example is given:

*Example 2*

The product of Example 1, 13½ lbs.; congo gum 9 lbs.; wood pitch, 2 lbs.; carbon black 1¼ lbs.; cotton flock 2¼ lbs.; zinc stearate, 6 oz.; rotten stone, 20 lbs.; and slate dust, 30 lbs., were compounded together on heated mixing rolls and sheeted off in the usual manner for making phonograph record molding compositions.

The above-described process is that contained in our abandoned application, Serial No. 497,070. We improved this method of treatment as described in our abandoned application Serial No. 756,104, filed June 20, 1947, in such a manner that better and more uniform products with definite predetermined softening points can be obtained. That is, we found that with the use of closed vessels equipped with condensers for both refluxing and distillation operations, we can vary the percentage of furfural and the percentages and kinds of oils used for plasticizing within a wide degree to obtain a variety of final resins all based on pinewood pitch as a starting material. Whereas we formerly preferred linseed oil, we found that we can use any drying oil such as linseed oil, tall oil, etc. We also found that the use of a micro-crystalline petroleum wax in place of beeswax is advantageous from the standpoint of wearing quality in the finished record. When using tall oil in place of linseed oil, we find a plasticizing action almost double that of the original specified material. We also found that the period of refluxing and final temperature of distillation have a marked effect upon the characteristics of the final product. Having now briefly described the general procedure and materials used in making a resin from pinewood pitch, the following further examples are given:

*Example 3*

In this example the pinewood pitch used is prepared by the method of Example 1 and comprises a residue low in abietic acid remaining after the separation of a refined rosin high in abietic acid from the resinous material obtained by the extraction of pinewood with a solvent.

The pitch described above, about 2000 lbs.; drying oil, e. g., linseed oil, about 60 lbs.; and softening agent, e. g., micro-crystalline petroleum wax, about 120 lbs.; are loaded together into an open tank containing steam coils and heated together until fluid at about 130° C. The melted mixture is then run into a closed vessel equipped with agitator and condensers for refluxing and distillation. With the condensers set for refluxing, heat is applied by means of gas burners or other suitable means until the temperature of the contents of the vessel is at about 150° C. Furfural, about 300 lbs., is then dripped into the kettle at a rate such that addition of the entire amount is accomplished within about fifteen minutes. During this time heating and agitation are continued so that constant reflux of furfural from and to the reaction mass is maintained. Refluxing is maintained for about thirty minutes, after which valves on the condenser are switched to the take-off position and heat is applied more rapidly to induce distillation. Distillation is continued until the temperature of the contents of the kettle reach about 270° C. Total time of reaction and distillation averages about seventy-five minutes. At this time heat is shut off and the contents of the kettle allowed to stir for ten minutes.

The contents of the kettle are then blown out into a storage tank where the resin is cooled by means of a water spray applied to the sides of the vessel until its temperature drops to about 200° C. This temperature is maintained while the resin is fed to a drum flaker for cooling. The final product is a hard, brownish-black, permanently thermoplastic, tough resin, delivered from the flaker in small flakes about one inch square by one-eighth inch thick. This resin is suitable for use as a binder in phonograph record compositions.

The final temperature cited in the above example is for the purpose of illustration only and can be varied from 220° C. to 280° C., depending upon the final softening point desired in the finished resin. The temperature specified, 270° C., will produce a resin with a ball and ring softening point between 197° F. and 203° F. Raising the final distillation temperature to 280° C. will raise the softening point of the resin to 210° F. and lowering the final distillation temperature to 250° C. will cause the finished resin to have a softening point of approximately 180° F. During the process of the distillation about 90 lbs. of furfural is recovered from the original kettle charge. This indicates that not more than about 10% furfural will react with wood pitch. However, we have found that the additional furfural serves a valuable function by carrying over certain volatile oils which are of no value in the resin and which cause an increase in tackiness and decrease in wearing quality in finished records. The wax may be omitted if desired, as above-stated.

*Example 3a*

In this example the pinewood pitch used is obtained in the same manner as that used in Example 1.

*Step A.*—The pitch described above, about 2000 lbs.; drying oil, e. g., linseed oil, about 80 lbs.; and softening agent, e. g., micro-crystalline petroleum wax or beeswax, about 260 lbs.; are loaded together into an open tank and heated together until fluid at about 130° C. The melted mixture is then run into a closed heated vessel, equipped with an agitator and condenser and rapidly distilled until the contents of the reaction vessel reach a temperature of about 230° C. to 270° C. preferably about 245° C. In this operation light oils are distilled from the pitch and recovered in the condenser. Preferably, simultaneously (Step B), a second portion of the pinewood pitch, about 2000 lbs., which has been melted in an open tank equipped with steam coils, is run into a closed reaction vessel, equipped with an agitator and condensers for refluxing and distillation. With the condensers set for refluxing, heat is applied by gas burners or other suitable means until the temperature of the contents of the vessel is at about 150° C. Furfural, about 300 lbs., is then dripped into the vessel at a rate such that the addition of the entire amount is accomplished within about fifteen minutes. During this period heating and agitation are continued so that constant reflux of furfural from and to the reaction mass is maintained. Refluxing is maintained for about thirty minutes after the addition of furfural is complete, following which the condensers are switched to the take-off position and heat applied more rapidly to induce distillation. Distillation is continued until the temperature of the contents of the reaction vessel reaches a temperature of about 260° C. to 290° C., preferably, about 290° C. At this time the heating is discontinued and the contents of the kettle allowed to stir about five minutes. The two separate reactions described above are preferably started at suitable intervals so that they will be completed at the same time.

*Step C.*—At the completion of the two reactions described above, the contents of both reaction vessels are run together into a storage tank equipped with an agitator and blended and cooled by means of a water spray on the sides of the tank to approximately 200° C. This temperature is maintained while the mass is fed to a drum flaker for cooling to about room temperature (70° F.) to solidify the mass and form a final product which is a solid, hard, brownish-black, permanently thermoplastic resin.

This method of reacting the resin in separate steps and then combining, as described, produces a resin which is similar to the product of Example 3 in many ways, but is characterized by a much lower softening point, approximately 170° F., and a greater plasticizing effect on such other resins as cellulose esters and ethers, notably ethyl cellulose, and cellulose acetate, as well as on vinyl compounds, e. g., vinyl acetate, vinyl chloride and polymers thereof as well as conjoint polymerization products of vinyl chloride and vinyl acetate. It also possesses a higher covering power for organic fillers commonly used in phonograph record compounds and permits the use of lower percentages of binder than is possible with other resins.

The proportions utilized in Steps A and B may be changed at will to produce a variety of resins with different physical and chemical properties, the example described being a preferred form of the invention. Thus, we may use in Step A about 1000 lbs. of pitch, about 40 lbs. of linseed oil, and about 130 lbs. of micro-crystalline wax with Step B remaining the same. Similarly, in Step A we use about 1000 lbs. pitch, about 60 lbs. oil, and about 200 lbs. micro-crystalline wax while retaining Step B as given in the example. Similarly, in Step A we use about 2000 lbs. pitch, about 80 lbs. oil, about 150 lbs. wax and in Step B, we use about 1000 lbs. pitch, and about 150 lbs. furfural.

Preferably, final products are obtained by using for each 100 parts of pitch about 2 to 15 parts furfural, about one-half to 6 parts drying oil, and about 1½ to 6 parts softening agent, and as an example of how these resins of Examples 3 and 3a may be used in phonograph record molding compositions, the following typical example is given:

*Example 4*

The products of Examples 3 or 3a, 16 lbs.; congo gum, 6 lbs.; wood pitch, 2 lbs.; carbon black, 1½ lbs.; cotton flock, 1½ lbs.; ground limestone, 20 lbs.; slate dust, 30 lbs.; and zinc stearate, 6 oz., are compounded together on heated mixing rolls and sheeted off in the usual manner for making phonograph record molding composition.

Records made from this compound were played two hundred times with a permanent type needle in a commercial phonograph, without an objectionable amount of surface breakdown and consequent loss of tone and increase of surface noise. As a comparison of the degree of improvement over the original wood pitch, a similar composition made with the wood pitch substituted for the modification product in the same formula produced records which broke down after twenty-five plays and were entirely unplayable after fifty plays.

*Example 5*

In connection with Example 3a above, the first reaction product obtained, namely, by reacting the pitch, oil and softening agent, as described, is useful as a plasticizer for the products of Examples 1, 3 and 3a and can also be used in small amounts as a plasticizer for cellulose esters and ethers, notably ethyl cellulose, and cellulose acetate, and for vinyl compounds, as named above.

The product of this reaction is run into a storage tank equipped with an agitator and cooled by means of a water spray on the side of the tank to about 130° C. This temperature is maintained while the product is fed to a drum flaker for cooling to about room temperature (70° F.) to solidify the mass and form a solid, relatively soft, black, permanently thermoplastic resin having a softening point of about 145° F.

The proportions may be varied in that the drying oil may be between about one-half to 6 parts based on 100 parts pitch, and the wax or other softening agent may be between about 1½ to 15 parts per 100 parts pitch.

The initial temperature of 130° C. may be departed from so long as the temperature employed is sufficient to fluidize the mixture of pitch, drying oil and wax, and the final temperature of 245° C. may also be varied, e. g., from about 230° F. to 270° C., depending upon the final softening point desired, e. g., about 130° F. to 160° F.

Although we are not sure that "drying oil" is an accurate definition of "tall oil," wherever "drying oil" is used in the claims it may be considered to include "tall oil" as well as such vegetable drying oils of the group containing linseed, tung, poppy, sunflower, and perilla oils.

Whenever "softening agent" is used herein, it is intended to cover waxes as described above such as beeswax and micro-crystalline petroleum waxes, as well as wood rosin, creosote oil, chlorinated naphthalenes.

We claim:

1. A permanently thermoplastic modification product of pinewood pitch formed by the reaction of a pine wood pitch, comprising a residue low in abietic acid remaining after the separation of refined rosin high in abietic acid from the resinous material obtained by the extraction of pinewood with a solvent, 100 parts by weight with furfural, 10 parts, and linseed oil, 6 parts, while being heated in combination and with agitation from room temperature to 232° C. in an open kettle.

2. The method of producing a substitute for shellac in phonograph records which includes heating a pinewood pitch, comprising a residue low in abietic acid remaining after the separation of refined rosin high in abietic acid from the resinous material obtained by extraction of pinewood with a solvent, with 10% of its weight of furfural, 6% of its weight of linseed oil and 1½% of beeswax in admixture together in an open kettle to 232° C.

3. As a substitute for shellac as a binder in phonograph record compositions, a permanently thermoplastic modification product of pinewood pitch formed by the reaction of a pinewood pitch, comprising a residue low in abietic acid remaining after the extraction of pinewood with a solvent, with furfural, not more than 10% by weight, and linseed oil, not more than 6% by weight, while being heated in combination and with agitation in an open kettle from room temperature to a temperature between 210° C. and 250° C.

4. The method of producing a substitute for shellac as a binder in phonograph records, comprising a permanently thermoplastic modification of pinewood pitch, which includes heating a pinewood pitch, comprising a residue low in abietic acid remaining after the extraction of a refined rosin high in abietic acid from the resinous material obtained by the extraction of pinewood with a solvent, with furfural, not more than 10% by weight, and linseed oil, not more than 6% by weight in admixture together to a temperature between 210° C. and 250° C. in an open kettle.

5. A permanently thermoplastic modification product of pinewood pitch formed by the reaction of a pinewood pitch, comprising a residue low in abietic acid remaining after the separation of refined rosin high in abietic acid from the resinous material obtained by the extraction of pinewood with a solvent, with furfural, 2% to 10% of such pinewood pitch modification product, and linseed oil, ½% to 6%, while being heated in combination and with agitation from room temperature to 230° C. in an open kettle.

6. The method of producing a permanently thermoplastic modification product of pinewood pitch which includes heating a pinewood pitch, comprising a residue low in abietic acid remaining after the separation of refined rosin high in abietic acid from the resinous material obtained by the extraction of pinewood with a solvent, with 2% to 10% of its weight of furfural and ½% to 6% of its weight of linseed oil in admixture together to 230° C. in an open kettle.

7. The method of producing a permanently thermoplastic modification product of pinewood pitch which includes heating a pinewood pitch, comprising a residue low in abietic acid remaining after the separation of a refined rosin high in abietic acid from the resinous material obtained by the extraction of pinewood with a solvent, with 10% of its weight of furfural and 6% of its weight of linseed oil in admixture together to 232° C. in an open kettle.

8. A permanently thermoplastic modification of pinewood pitch formed by the reaction of a pinewood pitch, comprising a residue low in abietic acid remaining after the separation of a refined rosin high in abietic acid from the resinous material obtained by the extraction of pinewood with a solvent, 100 parts by weight, with furfural, 15 parts, and linseed oil, 3 parts, and micro-crystalline petroleum wax, 6 parts, while being heated in combination and with agitation in a closed vessel under refluxing conditions at 150° C. for forty-five minutes, followed by distillation to 270° C.

9. A permanently thermoplastic resin characterized by a ball and ring softening point between 180° F. and 210° F. and comprising a modification of pinewood pitch formed by the reaction of the pinewood pitch, comprising the residue low in abietic acid remaining after the separation of refined rosin high in abietic acid from the resinous material obtained by the extraction of pinewood with a solvent, 100 parts by weight, with furfural, between 3 parts and 15 parts, a drying oil from one-half to 6 parts, and microcrystalline petroleum wax, 6 parts, while being heated in combination and with agitation in a closed vessel under refluxing conditions at 150° C. for forty-five minutes, followed by distillation to a temperature between 240° C. and 280° C.

10. The method of producing a permanently thermoplastic resin characterized by a ball and ring softening point between 180° F. and 210° F. and comprising a modification of pinewood pitch which includes reacting a pinewood pitch, comprising the residue low in abietic acid remaining after extraction of refined rosin high in abietic acid from the residue obtained by the extraction of pinewood with a solvent, with from 3% to 15% of its weight of furfural, ½% to 6% of its weight of drying oil, and 6% of its weight of microcrystalline petroleum wax, by heating and agitating in combination in a closed vessel under refluxing conditions at 150° C. for forty-five minutes, followed by distillation to a temperature between 240° C. and 280° C.

11. The method of producing a permanently thermoplastic modification of pinewood pitch which includes reacting a pinewood pitch, comprising a residue low in abietic acid remaining after the separation of refined rosin high in abietic acid from the resinous material obtained by the extraction of pinewood with a solvent, with 15% of its weight of furfural, 3% of its weight of linseed oil, and 6% of its weight of micro-crystalline petroleum wax, by heating and agitating in a closed vessel under refluxing conditions at 150° C. for forty-five minutes followed by distillation to 270° C.

12. A permanently thermoplastic modification product formed by the reaction at elevated temperature of a pinewood pitch, comprising a residue low in abietic acid remaining after the separation of refined rosin high in abietic acid from the resinous material obtained by the extraction of pinewood with a solvent, 100 parts by weight, with furfural, between 3 and 15 parts, a drying oil one-half to 6 parts, and a wax from the group consisting of beeswax and micro-crystalline petroleum wax, 1½ to 6 parts, while being heated in combination and with agitation to between 232° C. and 280° C.

13. A permanently thermoplastic modification product formed by the reaction at elevated temperature of a pinewood pitch comprising a residue low in abietic acid remaining after the separation of refined rosin high in abietic acid from the resinous material obtained by the extraction of pinewood with a solvent, with furfural, and a drying oil.

14. A permanently thermoplastic modification product formed by the reaction at elevated temperature of a pinewood pitch comprising a residue low in abietic acid remaining after the separation of refined rosin high in abietic acid from the resinous material obtained by the extraction of pinewood with a solvent, 100 parts by weight, with furfural between about 3 and 15 parts, and a drying oil between about one-half to 6 parts.

15. A permanently thermoplastic modification product formed by the reaction at elevated temperature of a pinewood pitch, comprising a residue low in abietic acid remaining after the separation of refined rosin high in abietic acid from the resinous material obtained by the extraction of pinewood with a solvent, with furfural, a drying oil and a compatible softening agent.

16. A permanently thermoplastic modification product formed by the reaction at elevated temperature of a pinewood pitch, comprising a residue low in abietic acid remaining after the separation of refined rosin high in abietic acid from the resinous material obtained by the extraction of pinewood with a solvent, 100 parts by weight, with furfural between about 3 and 15 parts, a drying oil between about one-half to 6 parts and a compatible softening agent between about 1½ to 6 parts.

17. The method of producing a permanently thermoplastic modification product of a pinewood pitch, comprising a residue low in abietic acid remaining after the separation of refined rosin high in abietic acid from the resinous material obtained by the extraction of pinewood with a solvent, which comprises heating the pitch with a drying oil and with furfural and reacting the said pitch with the same, the temperature of reaction being between about 150° C. and 290° C.

18. The method of producing a permanently thermoplastic modification product of a pinewood pitch, comprising a residue low in abietic acid remaining after the separation of refined rosin high in abietic acid from the resinous material obtained by the extraction of pinewood with a solvent, which comprises heating the pitch with furfural and with a drying oil and a compatible softening agent and reacting the pitch with the furfural and drying oil, the temperature of reaction being between about 150° C. and 290° C.

19. The method of producing a permanently thermoplastic modification product of pinewood pitch, comprising a residue low in abietic acid remaining after the separation of refined rosin high in abietic acid from the resinous material obtained by the extraction of pinewood with a solvent which comprises reacting the pitch with a drying oil and a compatible softening agent while heating to a temperature of from about 230° C. to 270° C. and combining the product while still molten with a second modification product of the pitch and produced by the reaction of the pitch with furfural while heating to a temperature of from about 260° C. to 290° C.

20. The method of making a permanently thermoplastic modification product of a pinewood pitch, comprising a residue low in abietic acid remaining after the separation of refined rosin high in abietic acid from the resinous material obtained by the extraction of pinewood with a solvent, which comprises heating the said pitch, furfural, a drying oil and a compatible softening agent to a temperature of from about 230° C. to 290° C.

21. The method of producing a permanently thermoplastic modification product of a pinewood pitch, comprising a residue low in abietic acid remaining after the separation of refined rosin high in abietic acid from the resinous material obtained by the extraction of pinewood with a solvent, which comprises heating the pitch, a drying oil and a compatible softening agent to a temperature between about 230° C. and 270° C.

22. The method of producing a permanently thermoplastic modification product of a pinewood pitch, comprising a residue low in abietic acid remaining after the separation of refined rosin high in abietic acid from the resinous material obtained by the extraction of pinewood with a solvent, which comprises heating the pitch, a drying oil and a compatible softening agent to a temperature between about 230° C. and 270° C., the drying oil being present in amount of about one-half to 6 parts, and the softening agent being present in amount of about 1½ to 15 parts per 100 parts of pitch.

23. A permanently thermoplastic modification product formed by the method of claim 21.

24. A permanently thermoplastic modification product formed by the method of claim 22.

THOMAS R. McELHINNEY.
THOMAS D. WOODRUFF.

No references cited.